United States Patent Office 2,829,635
Patented Apr. 8, 1958

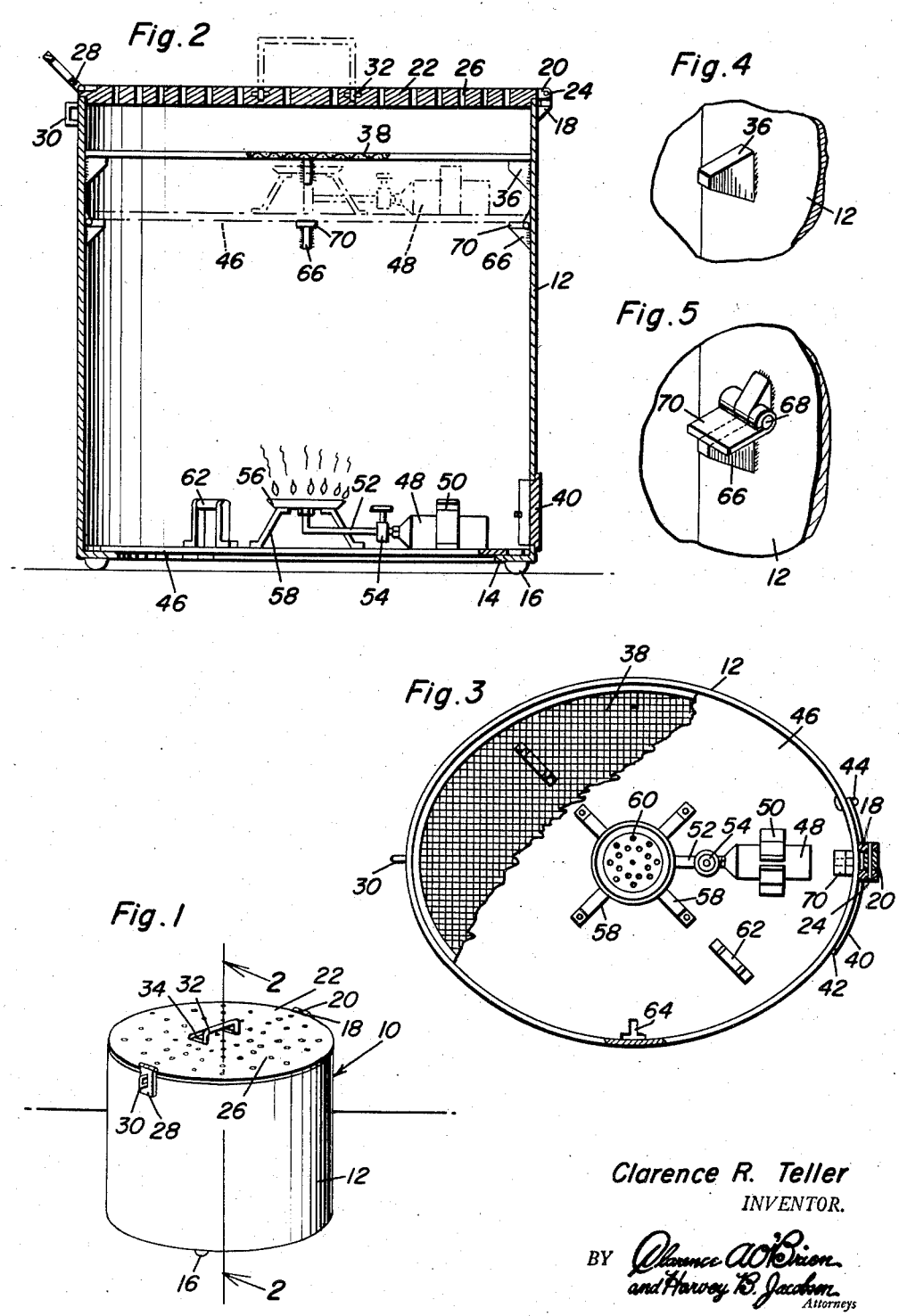

2,829,635

COMBINATION SEAT AND COOKING UNIT

Clarence R. Teller, Duluth, Minn.

Application December 8, 1954, Serial No. 473,984

1 Claim. (Cl. 126—208)

This invention generally relates to a combination seat and cooking unit for use by sportsmen and the like.

An object of this invention is to provide a combination seat and cooking unit especially useful for sportsmen such as hunters or fishermen for providing a seat and means for keeping warm together with means for cooking or preparing small meals that are especially appetizing to sportsmen.

Another object of this invention is to provide a combination seat and cooking unit having a heating element therein which may be vertically adjusted wherein the device may be utilized as a seat, a heating unit or a cooking unit by vertical adjustment of the heating device as desired.

A further object of this invention is to provide a combination seat and cooking unit wherein the cooking unit may be utilized for cooking means, making hot beverages, heating various articles of food wherein the heating unit or cooking unit may be vertically adjusted.

Yet another important object of the present invention is to provide a combination seat and cooking unit wherein a heating unit is provided and a seat is provided with a plurality of apertures so that heated air will circulate through the apertures and over the body of a person on the seat thereby retaining the person in a warm and comfortable condition during periods of cold weather.

Still further objects of the present invention reside in its simplicity of construction, ease of conversion from a seat to a cooking unit, its multi-purpose utility, its adaptability for its various purposes and its relatively inexpensive manufacture.

These, together with other objects and advantages which will become subsequently apparent reside in the details of construction and operation as more fully hereinafter described and claimed, reference being had to the accompanying draiwngs forming a part hereof, wherein like numerals refer to like parts throughout, and in which:

Figure 1 is a perspective view showing the combination seat and cooking unit of the present invention; and Figure 2 is a vertical sectional view taken substantially upon a plane passing along section line 2—2 of Figure 1 showing the interior details of construction of the combination seat and cooking unit showing the receptacle, the cooking grate and the seat member together with the means for vertical adjustment of the heating unit;

Figure 3 is a top plan view showing the seat member removed and showing the relationship of the component elements of the device of the present invention;

Figure 4 is a detailed enlarged perspective view showing the grate mounting lugs on the inner surface of the cylindrical member; and Figure 5 is an enlarged detailed perspective view showing the pivotal lugs for selectively securing the heating element in vertically raised position for forming a cooking unit.

Referring now specifically to the drawings, it will be seen that the numeral 10 generally designates the combination seat and cooking unit of the present invention including a generally oval-shaped tubular receptacle 12 of metallic construction wherein the bottom of the receptacle 12 is provided with an inwardly extending peripheral flange 14 for receiving a plurality of feet 16 for supporting the bottom of the receptacle in spaced relation to a supporting surface. Adjacent the upper end of the receptacle 12 at one edge thereof is provided a pair of pivot lugs 18 for receiving a pivot lug 20 on a closure member 22 by a pivot pin 24. The closure member 22 is provided with a plurality of apertures 26 and a locking half 28 is provided in opposite relation to the pivot pin 24 for engagement over a locking staple 30 secured to the outer periphery of the receptacle 12. The locking half 28 is pivotally secured to the closure member 22 for selective engagement over the generally U-shaped locking staple 30 wherein the closure 22 may be retained in closed position or pivoted about pivot pin 24 to an open position. A generally inverted U-shaped handle member 32 is pivotally secured within a generally U-shaped recess 34 in the upper surface of the closure member 22 wherein the handle member 32 may be pivoted to a vertical position for grasping by a hand so that the receptacle 12 may be transported or to a reclining position so that the handle 32 is recessed within the U-shaped groove 34 wherein a smooth upper surface is provided to the closure member 22 thereby providing a seat on the upper end of the receptacle 12.

Positioned in spaced relation to the open upper end of the receptacle 12 is a plurality of circumferentially spaced lugs 36 for receiving a grate 38 of a reticulated material wherein the grate 38 forms a surface for supporting pans or containers for cooking food or heating beverages in a manner described hereinafter.

Positioned adjacent the lower end of the receptacle 12 is a pivotally mounted door 40 connected to the receptacle 12 by hinge means 42 and selectively retained in closed position by latch means 44 wherein access is provided to the interior of the recetpacle 12 for lighting a heating unit as described hereinafter.

Positioned in the bottom of the receptacle 12 and resting on the inwardly extending flange 14 is a bottom member 46. Positioned on the upper surface of the bottom member 46 is a container of combustible fuel 48 secured in rigid position by clamp member 50. A fuel line 52 extends from the container 48 and a control valve 54 is provided in the fuel line 52. The outer end of the fuel line 52 is connected to a burner 56 that is supported in spaced relation to the bottom member 46 by brackets 58. The burner 56 is provided with a plurality of openings 60 for providing discharge of the fuel wherein the fuel may be lighted by the insertion of a match or other suitable device through the door 40 adjacent the lower end of the receptacle 12. Positioned on the upper surface of the bottom member 46 in spaced relation is a inverted U-shaped handle member 62 for raising and lowering the bottom member 46. It will be noted that a plurality of slots 64 are provided about the periphery of the bottom member 46 and each of the slots 64 are substantially T-shaped with the leg of the T extending inwardly from the head of the T which is substantially coextensive with the periphery of the bottom member 46.

Positioned vertically above the bottom of the receptacle 12 and below the projecting lugs 36 are a plurality of inwardly extending lugs 66 that include a transverse pivot pin 68 for pivotally receiving a supporting lug 70 wherein the supporting lug 70 will pivot from a horizontal supporting position against the upper surface of the lugs 66 to a vertical position wherein the bottom member 46 may pass upwardly above the supporting lug 70 thereby permitting the lug 70 to drop down against the upper surface of the lugs 66 thereby supporting the bottom 46 in vertically raised position substantially as illustrated in dotted lines in Figure 2.

In operation, the bottom member 46 is normally resting against the inwardly extending flange 14 adjacent the bottom of the receptacle 12 and the closure member 22 is utilized as a seat with the handle 32 collapsed into the handle receiving groove 34. In this manner, the burner 56 may be ignited and the device will then act as a seat having a heating unit in conjunction therewith for warming a person's body such as a sportsman in the nature of a hunter or fisherman. Of course, the device may be utilized without the heating unit in operation if desired. When it is desired to utilize the device of the present invention as a cooking unit, the handle 62 must be grasped after the seat 22 has been opened and the grate 38 removed and the bottom 46 is then moved vertically upwardly above the pivot lugs 70 until the pivot lugs 70 drop down against the lugs 66 wherein the bottom 46 will then be supported on the upper surface of the lugs 70. The grate 38 is positioned again on the lugs 36 in spaced relation to the bottom 46 wherein the burner 56 is closely adjacent the under-surface of the grate 38 wherein food may be heated or beverages heated on the grate 38. In this position, the device is utilized as a cooking unit thereby greatly enhancing the utility of the equipment that a sportsman may have with him without greatly increasing the weight and bulkiness of the necessary devices.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A combination seat and stove comprising a hollow receptacle having a continuous upstanding wall with a removable closure at the upper end thereof, the lower end of said wall being open and provided with a vertically movable bottom member, a burner unit mounted on the upper surface of said bottom member, said closure having openings for permitting passage of warm air, the openings in said closure utilizing a small portion of the upper surface thereof whereby the upper surface of the closure may be of employed as a seat, a grate of reticulated material mounted on said wall adjacent to and below the closure for permitting access thereto for cooking articles positioned thereon, and means for supporting the bottom member in a position adjacent the grate whereby the burner unit may be disposed immediately below the grate when cooking, the bottom end of the wall having inwardly extending means for supporting the bottom member and burner unit in remote relation to the closure when using the device as a stove, said means for supporting the bottom member in elevated position including opposed inwardly extending lugs disposed in a vertical plane on the inner surface of the wall, a supporting lug disposed in a horizontal plane disposed above each vertical lug, said horizontal lugs being pivotally attached to the wall immediately above the vertical lugs to permit swinging movement thereof to a position alongside the wall from a normal position resting on the upper edge of the vertical lugs, said bottom member having opposed radial slots for permitting the passage of said vertical lugs and the pivotal connection between the wall and horizontal lugs during upward movement of the bottom member, the upward movement of the bottom member past the vertical lugs causing the horizontal lugs to be pivoted upwardly until the bottom member is raised above the free ends of the horizontal lugs after which the horizontal lugs swing downwardly to a normal position for forming support means for retaining the bottom member in elevated position.

References Cited in the file of this patent

UNITED STATES PATENTS

| | | |
|---|---|---|
| 208,251 | Mains | Sept. 24, 1878 |
| 630,886 | Held | Aug. 15, 1899 |
| 1,300,594 | Ferdon | Apr. 15, 1919 |
| 2,517,254 | Steele | Aug. 1, 1950 |
| 2,612,272 | Cobbs | Sept. 30, 1952 |